(12) United States Patent
Saidi et al.

(10) Patent No.: US 7,801,079 B2
(45) Date of Patent: Sep. 21, 2010

(54) METHOD AND APPARATUS FOR BATTERY-AWARE DYNAMIC BANDWIDTH ALLOCATION FOR GROUPS OF WIRELESS SENSOR NODES IN A WIRELESS SENSOR NETWORK

(75) Inventors: Ali Saidi, St. Charles, IL (US); Silviu Chiricescu, Chicago, IL (US); Philip E. May, Palatine, IL (US); Kent D. Moat, Winfield, IL (US)

(73) Assignee: Motorola, Inc., Schaumburg, IL (US)

( * ) Notice: Subject to any disclaimer, the term of this patent is extended or adjusted under 35 U.S.C. 154(b) by 822 days.

(21) Appl. No.: 11/681,634

(22) Filed: Mar. 2, 2007

(65) Prior Publication Data
US 2008/0211666 A1 Sep. 4, 2008

(51) Int. Cl.
*H04W 4/00* (2009.01)
*H04B 7/212* (2006.01)

(52) U.S. Cl. .................. 370/331; 370/314; 370/329; 370/338; 370/341; 370/347

(58) Field of Classification Search .................. 370/345, 370/331, 310–314, 318, 328–329, 336–338, 370/341, 346–347, 350, 406–408; 340/539, 340/539.22, 501, 518, 521, 539.1, 539.21–539.23, 340/539.26; 455/73, 13.4, 41.2, 127.1, 127.5, 455/343.1–343.5, 418–420, 450, 463–464, 455/550.1, 561, 574

See application file for complete search history.

(56) References Cited

U.S. PATENT DOCUMENTS 5,241,542 A 8/1993 Natarajan et al.

6,807,159 B1 10/2004 Shorey et al.

(Continued)

FOREIGN PATENT DOCUMENTS

EP 2 127 231 A2 12/2009

(Continued)

OTHER PUBLICATIONS

International Search Report Issued Jun. 25, 2008, in connection with related PCT Application No. PCT/US2008/054266.

(Continued)

*Primary Examiner*—Meless N Zewdu

(57) ABSTRACT

A method and apparatus that allocates bandwidth among wireless sensor nodes in wireless sensor groups in a wireless sensor network (WSN) is disclosed. The method may include forming a plurality of wireless sensor node groups from a plurality of wireless sensor nodes based on battery levels of the wireless senor nodes, allocating transmission time slots for the wireless sensor nodes in each of the wireless sensor node groups based on at least one channel quality metric, determining average battery levels for each of the wireless sensor node groups and average battery level of all of the wireless sensor nodes, determining differences between the average battery levels of each of the wireless sensor node groups and the average battery level of all of the wireless sensor nodes, wherein if any difference in the average battery levels is above a predetermined threshold, regrouping the plurality of wireless sensor nodes according to the battery levels of the plurality wireless sensor nodes to minimize any variance in average battery level across all of the wireless sensor node groups.

20 Claims, 4 Drawing Sheets

U.S. PATENT DOCUMENTS

| | | | |
|---|---|---|---|
| 7,002,470 B1* | 2/2006 | Miao | 340/539.22 |
| 2003/0063585 A1* | 4/2003 | Younis et al. | 370/331 |
| 2006/0025229 A1* | 2/2006 | Mahajan et al. | 473/131 |

FOREIGN PATENT DOCUMENTS

| | | | |
|---|---|---|---|
| KR | 1020060063328 A | 6/2006 | |
| WO | 2004098129 A1 | 11/2004 | |
| WO | WO 2008-109250 A1 | 9/2008 | |

OTHER PUBLICATIONS

Simin Baharlou, "PCT/US2008/054266—PCT International Preliminary Report on Patentability," The International Bureau of WIPO, Geneva, Switzerland, Sep. 17, 2009.

* cited by examiner

METHOD AND APPARATUS FOR BATTERY-AWARE DYNAMIC BANDWIDTH ALLOCATION FOR GROUPS OF WIRELESS SENSOR NODES IN A WIRELESS SENSOR NETWORK

BACKGROUND OF THE INVENTION

1. Field of the Invention

The invention relates to wireless communication networks, and in particular, wireless sensor networks.

2. Introduction

In many wireless sensor networks (WSNs) with star topology, all the wireless sensor nodes except the coordinator are battery powered. The lifetime of such a network is given by the lifetime of the wireless sensor nodes. There are two possible scenarios: (1) the network "dies" when the last wireless sensor node in the network "dies", and (2) the network "dies" when the first wireless sensor node in the network dies. Maximizing the average capacity of a network described in the first scenario is a trivial exercise. Employing a "winner takes all" approach, the coordinator allocates all the available time slots to the wireless sensor node that has the best channel capacity.

However, doing the same for a network considered in the second scenario is a complicated joint optimization problem. On one hand, the wireless sensor nodes which have good channel capacity should be allocated as many time slots as possible. However, doing so would disproportionally drain the battery of those nodes.

This problem is expanded when a large number of nodes exist in the network that must be placed in wireless sensor node groups. If the wireless sensor nodes are not grouped properly and/or the transmissions time slots are not allocated properly, the network could "die" when one node in one group dies.

Therefore, it is desirable that all the wireless sensor nodes in the network "die" at the same time. If this goal is not achieved, then energy resources in the network are underutilized (i.e. there are nodes which can still transmit).

SUMMARY OF THE INVENTION

A method and apparatus that allocates bandwidth among wireless sensor nodes in wireless sensor groups in a wireless sensor network (WSN) is disclosed. The method may include forming a plurality of wireless sensor node groups from a plurality of wireless sensor nodes based on battery levels of the wireless senor nodes, allocating transmission time slots for the wireless sensor nodes in each of the wireless sensor node groups based on at least one channel quality metric, determining average battery levels for each of the wireless sensor node groups and the average battery level of all of the wireless sensor nodes, determining differences between the average battery levels of each of the wireless sensor node groups and the average battery level of all of the wireless sensor nodes, wherein if any difference in the average battery levels is above a predetermined threshold, regrouping the plurality of wireless sensor nodes according to the battery levels of the plurality wireless sensor nodes to minimize any variance in average battery level across all of the wireless sensor node groups.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The invention comprises a variety of embodiments, such as a method and apparatus and other embodiments that relate to the basic concepts of the invention.

The invention concerns how to maximize the average network capacity subject to also maximizing the lifetime of the network (i.e. all the wireless sensor nodes "die" at approximately the same time). In particular, the invention concerns the use of channel quality metrics and actual battery levels of the nodes to maximize the average network capacity.

Figure 1:
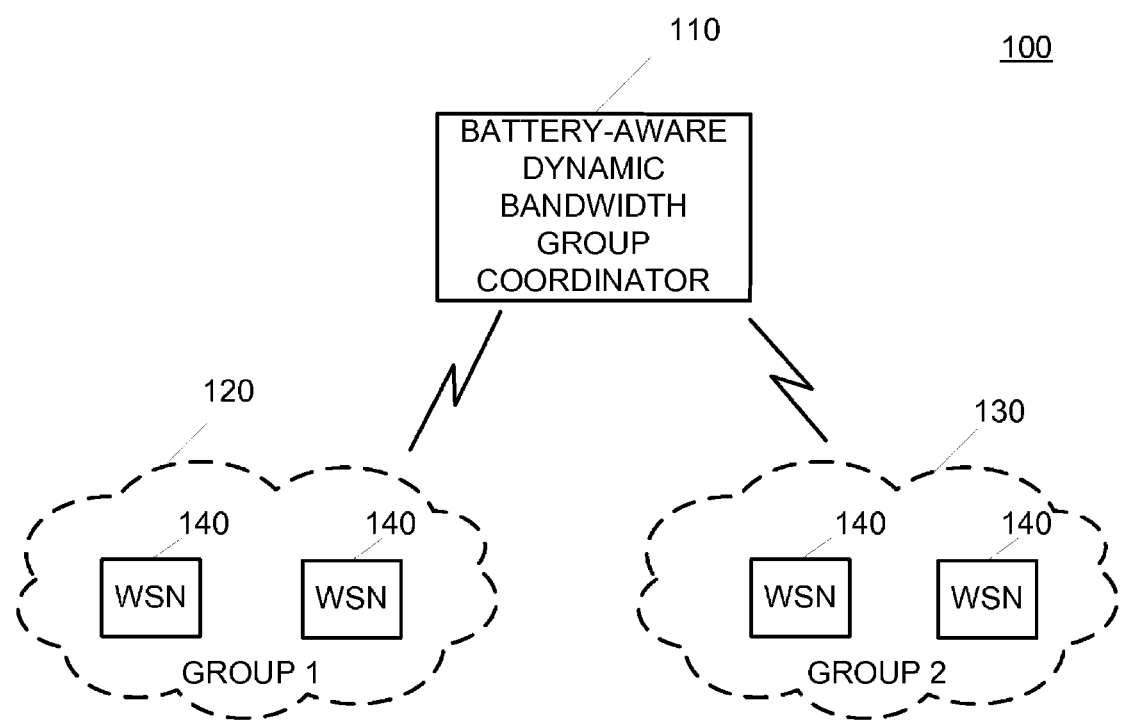
FIG. 1 illustrates an exemplary diagram of a wireless sensor network in accordance with a possible embodiment of the invention.

FIG. 1 illustrates an exemplary diagram of a wireless sensor network (WSN) 100 in accordance with a possible embodiment of the invention. In particular, the WSN 100 may include a battery-aware dynamic bandwidth group coordinator 110, and wireless sensor nodes groups 120, 130 that each contain a plurality of wireless sensor nodes 140. The battery-aware dynamic bandwidth group coordinator 110 may also be a node in the WSN 100. However, the battery-aware dynamic bandwidth group coordinator 110 serves to allocate transmission times of the various wireless sensor nodes 140 in the WSN 100. While FIG. 1 only shows two wireless sensor nodes 140 per group, this example is for ease of discussion as one of skill in the art may appreciate that more than two wireless sensor nodes (or a plurality of wireless sensor nodes) may exist per group in the WSN 100.

The battery-aware dynamic bandwidth group coordinator 110 and wireless sensor nodes 140 may represent or be part of an electronic battery-operated device in the WSN 100. For example, the battery-aware dynamic bandwidth group coordinator 110 and wireless sensor nodes 140 may represent a mobile communication device. The mobile in a communication device may be a portable MP3 player, satellite radio receiver, AM/FM radio receiver, satellite television, iPod, portable laptop, portable computer, wireless radio, wireless telephone, portable digital video recorder, cellular telephone, mobile telephone, or personal digital assistant (PDA), for example.

The WSN 100 may allow wireless sensor nodes 140 to communicate with other wireless sensor nodes 140 within the same or different wireless sensor node groups 120, 130, as well as the battery-aware dynamic bandwidth group coordinator 110.

Figure 2:
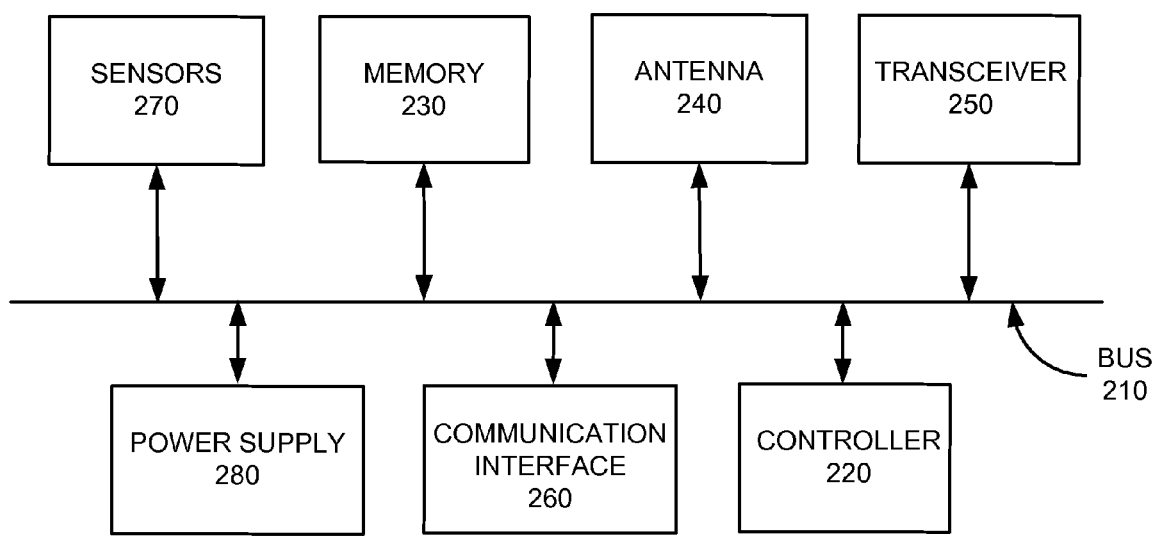
FIG. 2 illustrates a block diagram of an exemplary battery-aware dynamic bandwidth group coordinator/wireless sensor node in accordance with a possible embodiment of the invention.

FIG. 2 illustrates a block diagram of either an exemplary battery-aware dynamic bandwidth group coordinator 110/an exemplary wireless sensor node 140, in accordance with a possible embodiment of the invention. Since the battery-aware dynamic bandwidth group coordinator 110 is also a wireless sensor node in the WSN 100, the exemplary structure shown in FIG. 2 may apply to both an exemplary battery-aware dynamic bandwidth group coordinator 110 and an exemplary wireless sensor node 140. For ease of discussion, we will refer to the exemplary structure shown in FIG. 2 as a battery-aware dynamic bandwidth group coordinator 110.

The battery-aware dynamic bandwidth group coordinator 110 may include a bus 210, a controller 220, a memory 230, an antenna 240, a transceiver 250, a communication interface 260, sensors 270, and a power supply 280. Bus 210 may permit communication among the components of the battery-aware dynamic bandwidth group coordinator 110.

Controller 220 may include at least one conventional processor or microprocessor that interprets and executes instructions. Memory 230 may be a random access memory (RAM) or another type of dynamic storage device that stores information and instructions for execution by controller 220. Memory 230 may also include a read-only memory (ROM) which may include a conventional ROM device or another type of static storage device that stores static information and instructions for controller 220.

Transceiver 250 may include one or more transmitters and receivers. The transceiver 250 may include sufficient functionality to interface with any network or communications station and may be defined by hardware or software in any manner known to one of skill in the art. The controller 220 is cooperatively operable with the transceiver 250 to support operations within the WSN 100. The transceiver 250 transmits and receives transmissions via the antenna 240 in a manner known to those of skill in the art.

Communication interface 260 may include any mechanism that facilitates communication via the WSN 100. For example, communication interface 260 may include a modem. Alternatively, communication interface 260 may include other mechanisms for assisting the transceiver 250 in communicating with other devices and/or systems via wireless connections.

Sensors 270 may include one or more sensors which detect, read, sense, etc. temperature, pressure, humidity, motion, vibration, sound, etc., for example. The information generated from sensors 270 may be stored in memory 230 and/or transmitted by transceiver 250 to another wireless sensor node 140, another network device, or the battery-aware dynamic bandwidth group coordinator 110 (if the sensors 270 reside on a wireless sensor node other than the battery-aware dynamic bandwidth group coordinator 110).

In the case of the battery-aware dynamic bandwidth group coordinator 110, the power supply 280 may represent either a DC (e.g., battery) or AC power supply as the battery-aware dynamic bandwidth group coordinator 110 may be either DC or AC powered. However, with respect to wireless sensor nodes 140, the power supply 280 may represent a DC power source, such as a battery.

The battery-aware dynamic bandwidth group coordinator 110 may perform such functions in response to controller 220 by executing sequences of instructions contained in a computer-readable medium, such as, for example, memory 230. Such instructions may be read into memory 230 from another computer-readable medium, such as a storage device or from a separate device via communication interface 260.

The WSN 100 and the battery-aware dynamic bandwidth group coordinator 110 illustrated in FIGS. 1-2 and the related discussion are intended to provide a brief, general description of a suitable computing environment in which the invention may be implemented. Although not required, the invention will be described, at least in part, in the general context of computer-executable instructions, such as program modules, being executed by the battery-aware dynamic bandwidth group coordinator 110. Generally, program modules include routine programs, objects, components, data structures, etc. that perform particular tasks or implement particular abstract data types. Moreover, those skilled in the art will appreciate that other embodiments of the invention may be practiced in communication network environments with many types of communication equipment and computer system configurations which operate off of batteries, including cellular devices, mobile communication devices, portable computers, hand-held devices, portable multi-processor systems, microprocessor-based or programmable consumer electronics, and the like.

For illustrative purposes, battery-aware dynamic bandwidth group coordination process will be described below in relation to the block diagrams shown in FIGS. 1 and 2.

Figure 3:
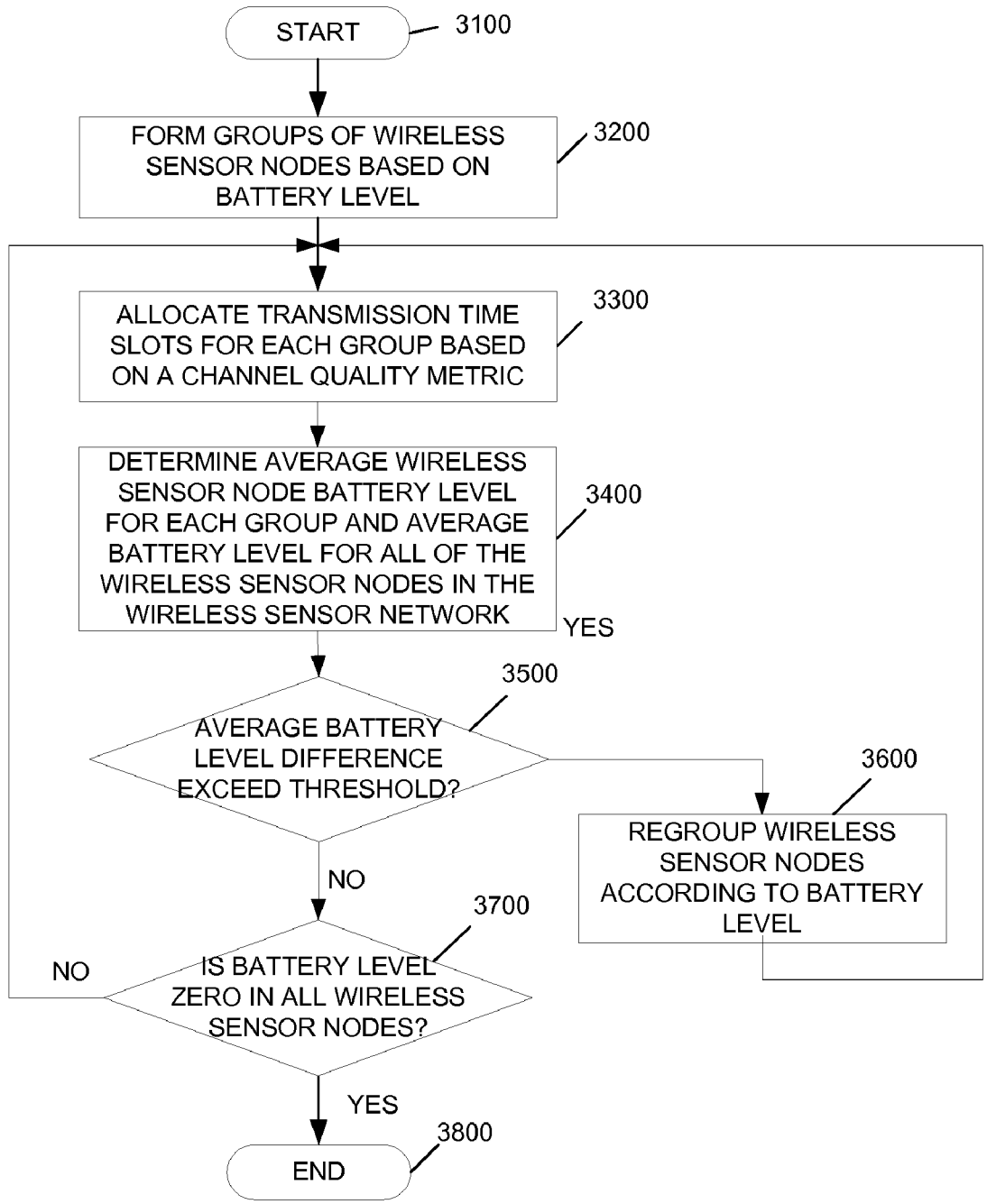
FIG. 3 is an exemplary flowchart illustrating one possible battery-aware dynamic bandwidth coordination process for a homogeneous group of wireless sensor nodes in accordance with one possible embodiment of the invention.

FIG. 3 is an exemplary flowchart illustrating some of the basic steps associated with a battery-aware dynamic bandwidth group coordination process for a homogeneous group of wireless sensor nodes 140 in accordance with a possible embodiment of the invention. In a homogeneous group of wireless sensor nodes, wireless sensor nodes 140 may be all the same type and collect the same type of data. For example, if five temperature nodes and five humidity nodes existed, all of the temperature nodes into would be placed in one group and all the humidity nodes would be placed in a different group. Therefore, without loss of generality, it is assumed that as long as one wireless sensor node 140 in the group is alive, the wireless sensor node group 120, 130 is alive as well.

The process begins at step 3100 and continues to step 3200 where the battery-aware dynamic bandwidth group coordinator 110 forms groups of wireless sensor nodes 140 based on the battery levels of the wireless sensor nodes 140.

At step 3300, the battery-aware dynamic bandwidth group coordinator 110 allocates transmission time slots for the plurality of wireless sensor nodes 140 in each wireless sensor node group 120, 130 based on at least one channel quality metric. Many of the modern low-power radios, for example, provide a measure of the quality of the communication channel. Two examples of measures of channel quality are the relative signal strength indicator (RSSI) and link quality indicator (LQI). Several studies have shown that LQI is highly correlated with the packet error rate (PER). Thus, to avoid the additional overhead of obtaining channel quality values, LQI may be used as the channel quality metric.

During this bandwidth allocation process, the amount of time allocated to node i, is given by, $$T_i(q_i) = \frac{q_i}{\sum_{j=1}^{N} q} T_P \qquad (1)$$

where $T_p$ is the total bandwidth in every allocation/reallocation period and $q_i$ is a channel quality metric for node i.

At step 3400, the battery-aware dynamic bandwidth group coordinator 110 determines the average battery levels of wireless sensor nodes 140 in each wireless sensor node group 120, 130. The average battery level (or capacity) may be defined as the average amount of charge the battery delivers under given load and temperature conditions. The invention is independent of the battery type and/or model.

At step 3500, the battery-aware dynamic bandwidth group coordinator 110 determines whether the differences between the average battery levels of each of the wireless sensor node groups 120, 130 and the average battery level of all of the wireless sensor nodes in the WSN 100 exceeds a threshold. The threshold may be predetermined, based on lookup table, determined by a process according to environmental conditions, etc.

For example, assume that the average battery level BL for wireless sensor nodes $N_1$-$N_{100}$ are $BL_1$-$BL_{100}$, respectively. If $|BL_1$-$BL_{AVG}|\leq e$, with i→100, and $BL_{AVG}$ may be computed as the total of all battery levels of all of the wireless sensor nodes divided by the total number of nodes, then the wireless sensor nodes 140 will be in an "equilibrium" state and the battery-aware dynamic bandwidth group coordinator 110 will dynamically allocate time slots proportionally to the channel quality of the wireless sensor nodes 140.

If the battery-aware dynamic bandwidth group coordinator 110 determines that any of the battery level differences between wireless sensor nodes 140 exceeds the threshold, then at step 3600, battery-aware dynamic bandwidth group coordinator 110 regroups the wireless sensor nodes 140 according to the battery level of the wireless sensor nodes to minimize any variance in average battery level across all of the wireless sensor node groups.

For example, assume the battery-aware dynamic bandwidth group coordinator 110 is transmitting information received from the wireless sensor nodes 140. However, after awhile, the battery-aware dynamic bandwidth group coordinator 110 determines that the temperature wireless sensor node in the first group is going to run out of battery so reliable temperature information will not be available from this group. As a result, the battery-aware dynamic bandwidth group coordinator 110 will regroup the wireless sensor nodes 140 to ensure that not only the wireless sensor nodes 140 in the wireless sensor node groups 120, 130 die at about the same time, but that all the wireless sensor nodes 140 in all the wireless sensor node groups 120, 130 will die at approximately at the same time.

After the regrouping occurs, the process then returns to step 3300 immediately, or after a delay period, for example, where the battery-aware dynamic bandwidth group coordinator 110 allocates transmission time slots for the plurality of wireless sensor nodes 140 in each wireless sensor node groups 120, 130 based on at least one channel quality metric.

Thus, in a homogeneous wireless sensor node group 120, 130, the strategy that maximizes life time of the network is to maintain equal average battery power between the wireless sensor node groups 120,130. This can easily be achieved by using one of the many variations of a Bin Packing process.

The Bin Packing variation in this case refers to the problem of filling several identical bins (sensor groups) of a given capacity (desired cumulative battery level of each wireless sensor node group 120,130) with a collection of items (battery levels of the wireless sensor nodes 140) such that variations of the group battery levels from their desired values are small. The Bin Packing problem is shown to be NP-hard (Nondeterministic Polynomial-time hard), which means that finding a solution to the optimal processes requires exponential time. However, there are several heuristic approaches that can produce good results but are much less complex. Some of the more well-known of these Bin Backing processes are First-Fit, Next-Fit and Best-Fit, for example.

However, using dynamic bandwidth allocation within each wireless sensor node group 120, 130 leads, in the longer run, to variations in average battery level of the wireless sensor node groups 120, 130. To compensate for this effect, dynamic changes in the wireless sensor node groups 120, 130 or formations of the wireless sensor node groups 120, 130 may be periodically required If at step 3500, the battery-aware dynamic bandwidth group coordinator 110 determines that the average battery level differences in wireless sensor node groups 120, 130 do not exceed the threshold, the battery-aware dynamic bandwidth group coordinator 110 proceeds to step 3700 where the battery-aware dynamic bandwidth group coordinator 110 determines whether the battery level is zero for all wireless sensor nodes 140 in the WSN 100.

If the battery-aware dynamic bandwidth group coordinator 110 determines that the battery level in all the wireless sensor nodes 140 is not zero (or "effectively" not zero), the process returns to step 3300 where battery-aware dynamic bandwidth group coordinator 110 allocates transmission time slots for the plurality of wireless sensor nodes 140 in each wireless sensor node group 120, 130 based on at least one channel quality metric.

If at step 3700, the battery-aware dynamic bandwidth group coordinator 110 determines that the battery level is zero (or effectively zero) in all wireless sensor nodes 140 in the WSN 100 (i.e., the network has "died"), the process goes to step 3800, and ends. Note that a node "dies" when its battery cannot support its normal operation. Therefore, as indicated above, while the battery level may not be exactly zero, it may be effectively zero when its battery can no longer support the node's normal operation.

Figure 4:
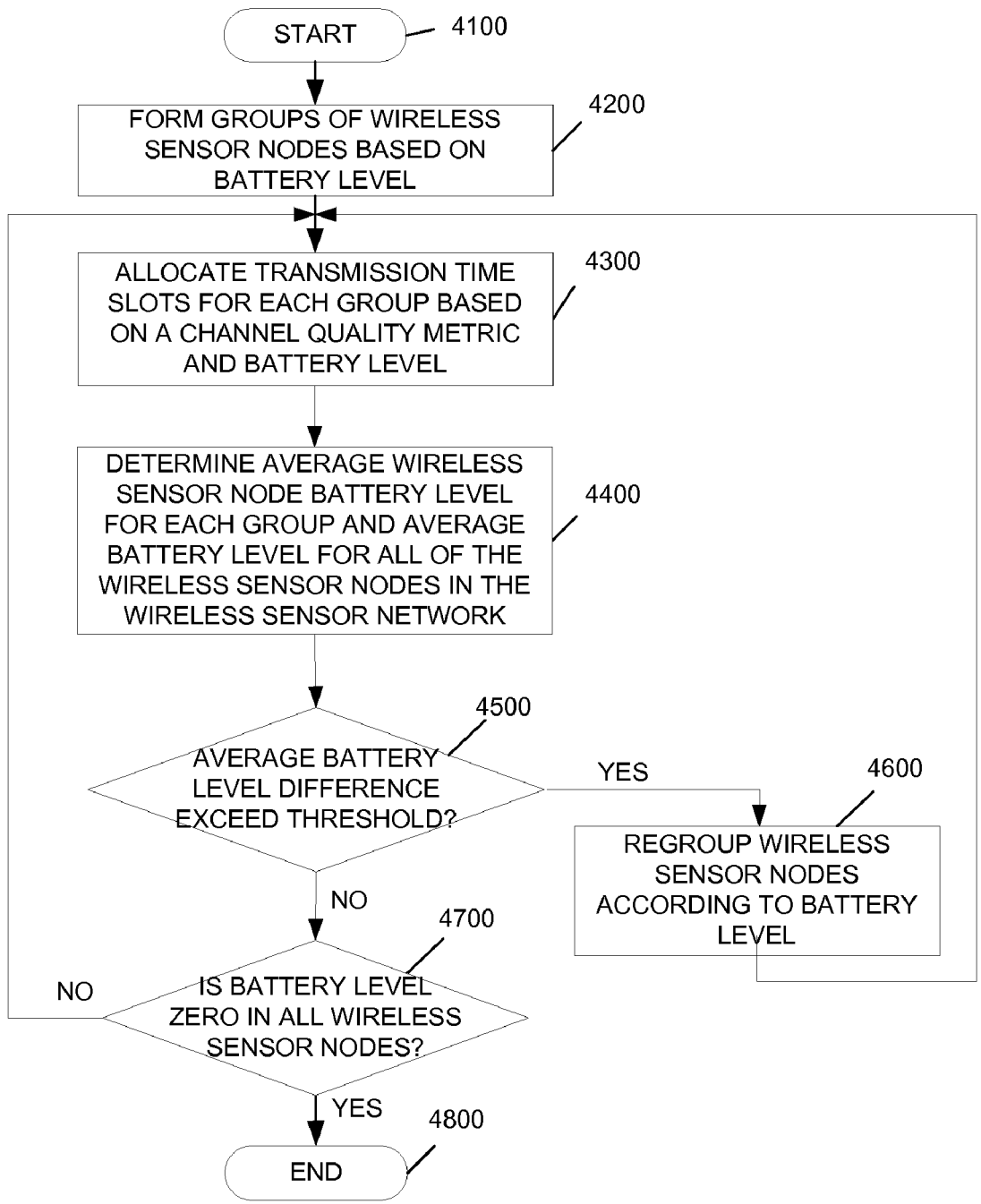
FIG. 4 is an exemplary flowchart illustrating one possible battery-aware dynamic bandwidth coordination process for a heterogeneous group of wireless sensor nodes in accordance with one possible embodiment of the invention.

FIG. 4 is an exemplary flowchart illustrating some of the basic steps associated with a battery-aware dynamic bandwidth group coordination process for a heterogeneous group of wireless sensor nodes 140 in accordance with a possible embodiment of the invention. In a heterogeneous group of wireless sensor nodes, wireless sensor nodes 140 nodes collect different sets of data which are all needed for the application to be functional. For example, a temperature node, humidity node, pressure node, and a camera may exist so that the pressure and humidity wireless sensor node may be placed together in one group and the camera and humidity wireless sensor node may be placed in a different group. Therefore, the wireless sensor node group 120, 130 dies (runs out of battery) when the first wireless sensor node 140 in the wireless sensor node group 120, 130 dies.

The process begins at step 4100 and continues to step 4200 where the battery-aware dynamic bandwidth group coordinator 110 forms groups of wireless sensor nodes 140 based on the battery levels of the wireless sensor nodes 140.

At step 4300, the battery-aware dynamic bandwidth group coordinator 110 allocates transmission time slots for the plurality of wireless sensor nodes 140 in each wireless sensor node group 120, 130 based on at least one channel quality metric and wireless sensor node battery level within the wireless sensor node group 120, 130.

During this bandwidth allocation process, the bandwidth allocated to each node, i, is proportional to its channel quality $q_i$, and its battery level, $BL_i$ $$T_i(q_i, BL_i) = \frac{q_i}{\sum_{j=1}^{N} q_j} T_{P1} + \frac{BL}{\sum_{j=1}^{N} BL_j} T_{P2} \quad (2)$$

where $T_{p1}+T_{p2}=T_p$ and $T_p$ is the total bandwidth in every allocation/re-allocation period. The choices for $T_{p1}$ and $T_{p2}$ depend on the variance of the battery levels. If the variance is high, increasing $T_{p2}$ will result in faster convergence. However, fast convergence to minimum variance will also result in losses in network capacity. This tradeoff is a design choice which is a function of application.

At step 4400, the battery-aware dynamic bandwidth group coordinator 110 determines the average battery levels of wireless sensor nodes 140 in each wireless sensor node group 120, 130.

As in the homogeneous case, at step 4500, the battery-aware dynamic bandwidth group coordinator 110 determines whether the differences between the average battery levels of each of the wireless sensor node groups 120, 130 and the average battery level of all of the wireless sensor nodes in the WSN 100 exceeds a threshold. If the battery-aware dynamic bandwidth group coordinator 110 determines that any of the battery level differences between wireless sensor nodes 140 exceeds the threshold, then at step 4600, battery-aware dynamic bandwidth group coordinator 110 regroups the wireless sensor nodes 140 according to the battery level of the wireless sensor nodes to minimize any variance in average battery level across all of the wireless sensor node groups and in battery levels of nodes within each wireless sensor node group.

Like the homogeneous case, dynamic bandwidth allocation within each wireless sensor node group 120, 130 leads, in the longer run, to increased variations in average battery level of the wireless sensor node groups 120, 130. Therefore, the wireless sensor nodes 140 may be regrouped to compensate for this effect. This process may be done by either, monitoring the variations and changing the wireless sensor node groups 120, 130 as needed, or by updating the group formation periodically.

After the regrouping occurs, the process then returns to step 4300 immediately, or after a delay period, for example, where the battery-aware dynamic bandwidth group coordinator 110 allocates transmission time slots for the plurality of wireless sensor nodes 140 in each wireless sensor node group 120, 130 based on at least one channel quality metric.

Thus, as in the homogeneous case, the strategy that maximizes the lifetime of the network is to maintain an equal average battery power between the wireless sensor node groups 120, 130. This can easily be achieved by using one of the many variations of a Bin Packing process discussed above.

If at step 4500, the battery-aware dynamic bandwidth group coordinator 110 determines that the average battery level differences in wireless sensor node groups 120, 130 do not exceed the threshold, the battery-aware dynamic bandwidth group coordinator 110 proceeds to step 4700 where the battery-aware dynamic bandwidth group coordinator 110 determines whether the battery level is zero for all wireless sensor nodes 140 in the WSN 100.

If the battery-aware dynamic bandwidth group coordinator 110 determines that the battery level in all the wireless sensor nodes 140 is not zero (or "effectively" not zero), the process returns to step 4300 where battery-aware dynamic bandwidth group coordinator 110 allocates transmission time slots for the plurality of wireless sensor nodes 140 in each wireless sensor node group 120, 130 based on at least one channel quality metric.

If at step 4700, the battery-aware dynamic bandwidth group coordinator 110 determines that the battery level is zero (or effectively zero) in all wireless sensor nodes 140 in the WSN 100 (i.e., the network has "died"), the process goes to step 4800, and ends.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the battery-aware dynamic bandwidth group coordinator 110 in FIGS. 1 and 2 each processing the content in various possible ways. It does not necessarily need to be one system used by all end users. Accordingly, the appended claims and their legal equivalents should only define the invention, rather than any specific examples given.

We claim:

1. A method for allocating bandwidth among wireless sensor nodes in wireless sensor groups in a wireless sensor network (WSN), comprising:
    forming a plurality of wireless sensor node groups from a plurality of wireless sensor nodes based on battery levels of the wireless sensor nodes;
    allocating transmission time slots for the wireless sensor nodes in each of the wireless sensor node groups based on at least one channel quality metric;
    determining average battery levels for each of the wireless sensor node groups and average battery level for all of the wireless sensor nodes in the wireless sensor network;
    determining differences between the average battery levels of each of the wireless sensor node groups and the average battery level of all of the wireless sensor nodes, wherein when a difference in the average battery levels is above a predetermined threshold,
    regrouping the plurality of wireless sensor nodes according to the battery levels of the plurality wireless sensor nodes to minimize a variance in average battery level across all of the wireless sensor node groups.

2. The method of claim 1, wherein when the differences in the average battery levels of the wireless sensor node groups are not above a predetermined threshold,
    allocating transmission time slots for the plurality of wireless sensor nodes in the wireless sensor node groups based on at least one channel quality metric.

3. The method of claim 1, wherein the transmission time slots allocation for the plurality of wireless sensor nodes in the wireless sensor node groups is based on at least one channel quality metric and the battery levels of the plurality wireless sensor nodes and the regrouping of the plurality of wireless sensor nodes is performed according to the battery levels of the plurality wireless sensor nodes to minimize the variance in the average battery level across all of the wireless sensor node groups and in battery levels of nodes within each wireless sensor node group.

4. The method of claim 1, wherein the at least one channel quality metric is at least one of a link quality indicator and a relative signal strength indicator.

5. The method of claim 1, wherein one of the plurality of wireless sensor nodes serves as a battery-aware dynamic bandwidth group coordinator and allocates transmission time slots to other wireless sensor nodes in the wireless sensor node groups in the wireless sensor network.

6. The method of claim 1, wherein the each plurality of wireless sensor nodes transmits sensor information, the sensor information being at least one of temperature, pressure, humidity, motion, vibration, and sound.

7. The method of claim 1, wherein each of the plurality of the wireless sensor nodes is part of a mobile communication device, the mobile communication device being one of a portable MP3 player, satellite radio receiver, AM/FM radio receiver, satellite television, iPod, portable laptop, portable computer, wireless radio, wireless telephone, portable digital video recorder, cellular telephone, mobile telephone, and personal digital assistant (PDA).

8. An apparatus that allocates bandwidth among wireless sensor nodes in a wireless sensor network (WSN), comprising:
    one or more sensors that sense environmental conditions;
    a transceiver that transmits sensor information related to the sensed environmental conditions using transmission time slots; and
    a controller that forms a plurality of wireless sensor node groups from a plurality of wireless sensor nodes based on battery levels of the wireless sensor nodes, allocates the transmission time slots for the wireless sensor nodes in each of the wireless sensor node groups based on at least one channel quality metric, determines average battery levels for each of the wireless sensor node groups and average battery level for all of the wireless sensor nodes in the wireless sensor network, and determines differences between the average battery levels of each of the wireless sensor node groups and average battery level for all of the wireless sensor nodes in the wireless sensor network, wherein when a difference in the average battery levels is above a predetermined threshold, the controller regroups the plurality of wireless sensor nodes according to the battery levels of the plurality wireless sensor nodes to minimize a variance in an average battery level across all of the wireless sensor node groups.

9. The apparatus of claim 8, wherein when the controller determines that the differences in the average battery levels of the wireless sensor node groups are not above a predetermined threshold, the controller allocates transmission time slots for the plurality of wireless sensor nodes in the wireless sensor node groups based on at least one channel quality metric.

10. The apparatus of claim 8, wherein the controller allocates transmission time slots for the plurality of wireless sensor nodes in the wireless sensor node groups based on at least one channel quality metric and the battery levels of the plurality of the wireless sensor nodes and regroups the plurality of wireless sensor nodes according to the battery levels of the plurality wireless sensor nodes to minimize the variance in the average battery level across all of the wireless sensor node groups and in battery levels of the wireless sensor nodes within each wireless sensor node group.

11. The apparatus of claim 8, wherein the at least one channel quality metric is at least one of a link quality indicator and a relative signal strength indicator.

12. The apparatus of claim 8, wherein the apparatus serves as a battery-aware dynamic bandwidth group coordinator which allocates transmission time slots to the other wireless sensor nodes in the plurality of wireless sensor node groups in the wireless sensor network.

13. The apparatus of claim 8, wherein the transmitted sensor information is related to at least one of temperature, pressure, humidity, motion, vibration, and sound.

14. The apparatus of claim 8, wherein the apparatus is part of a mobile communication device, the mobile communication device being one of a portable MP3 player, satellite radio receiver, AM/FM radio receiver, satellite television, iPod, portable laptop, portable computer, wireless radio, wireless telephone, portable digital video recorder, cellular telephone, mobile telephone, and personal digital assistant (PDA).

15. A mobile communication device, comprising:
    one or more sensors that sense environmental conditions;
    a transceiver that transmits sensor information related to the sensed environmental conditions using transmission time slots; and
    a controller that forms a plurality of wireless sensor node groups from a plurality of wireless sensor nodes based on battery levels of the wireless sensor nodes, allocates the transmission time slots for the wireless sensor nodes in each of the wireless sensor node groups based on at least one channel quality metric, determines average battery levels for each of the wireless sensor node groups and average battery level for all of the wireless sensor nodes in the wireless sensor network, and determines differences between the average battery levels of each of the wireless sensor node groups and average battery level for all of the wireless sensor nodes in the wireless sensor network, wherein when a difference in the average battery levels is above a predetermined threshold, the controller regroups the plurality of wireless sensor nodes according to the battery levels of the plurality wireless sensor nodes to minimize a variance in an average battery level across all of the wireless sensor node groups.

16. The mobile communication device of claim 15, wherein when the controller determines that the differences in the average battery levels of the wireless sensor node groups are not above a predetermined threshold, the controller allocates transmission time slots for the plurality of wireless sensor nodes in the wireless sensor node groups based on at least one channel quality metric.

17. The apparatus of claim 15, wherein the controller allocates transmission time slots for the plurality of wireless sensor nodes in the wireless sensor node groups based on the at least one channel quality metric and the battery levels of the plurality wireless sensor nodes and regroups the plurality of wireless sensor nodes according to the battery levels of the plurality wireless sensor nodes to minimize the variance in the average battery level across all of the wireless sensor node groups and in battery levels of the wireless sensor nodes within each wireless sensor node group.

18. The mobile communication device of claim 15, wherein the at least one channel quality metric is at least one of a link quality indicator and a relative signal strength indicator.

19. The mobile communication device of claim 15, wherein the transmitted sensor information is related to at least one of temperature, pressure, humidity, motion, vibration, and sound.

20. The mobile communication device of claim 15, wherein the mobile communication device is one of a portable MP3 player, satellite radio receiver, AM/FM radio receiver, satellite television, iPod, portable laptop, portable computer, wireless radio, wireless telephone, portable digital video recorder, cellular telephone, mobile telephone, and personal digital assistant (PDA).

* * * * *

UNITED STATES PATENT AND TRADEMARK OFFICE
CERTIFICATE OF CORRECTION

PATENT NO. : 7,801,079 B2
APPLICATION NO. : 11/681634
DATED : September 21, 2010
INVENTOR(S) : Saidi et al.

It is certified that error appears in the above-identified patent and that said Letters Patent is hereby corrected as shown below:

In Column 5, Lines 7-9, in Equation (1), delete " $T_i(q_i) = \dfrac{q_i}{\sum_{j=1}^{N} q} T_P$ " and insert -- $T_i(q_i) = \dfrac{q_i}{\sum_{j=1}^{N} q_j} T_P$ --, therefor.

In Column 5, Line 31, delete "| BL$_1$" and insert -- | BL$_i$ --, therefor.

In Column 8, Line 34, delete "thereof" and insert -- thereof) --, therefor.

Signed and Sealed this
Thirty-first Day of July, 2012

David J. Kappos
*Director of the United States Patent and Trademark Office*